United States Patent [19]

Hashizume et al.

[11] Patent Number: 4,973,012
[45] Date of Patent: Nov. 27, 1990

[54] MAGNETIC TAPE CASSETTE

[75] Inventors: Kenji Hashizume, Nagano; Masatoshi Okamura; Takateru Satoh, both of Saku, all of Japan

[73] Assignee: TDK Corporation, Tokyo, Japan

[21] Appl. No.: 337,430

[22] Filed: Apr. 13, 1989

[30] Foreign Application Priority Data

Apr. 27, 1988 [JP] Japan .................. 63-58250[U]

[51] Int. Cl.$^5$ ............... G11B 15/32; G11B 23/087; G11B 23/02
[52] U.S. Cl. .................... 242/199; 242/198; 360/132
[58] Field of Search ............. 242/198, 199; 360/132

[56] References Cited

U.S. PATENT DOCUMENTS

| 4,304,374 | 12/1981 | Okamura et al. | 242/199 |
| 4,405,097 | 9/1983 | Gebeke | 242/199 |
| 4,463,918 | 8/1984 | Takagi | 242/199 |
| 4,569,492 | 2/1986 | Gelardi et al. | 242/199 |
| 4,606,513 | 8/1986 | Gelardi et al. | 242/199 |

Primary Examiner—John Petrakes
Assistant Examiner—John P. Darling
Attorney, Agent, or Firm—Oblon, Spivak, McClelland, Maier & Neustadt

[57] ABSTRACT

A magnetic tape cassette comprises a casing consisting of upper and lower half casings, reel hubs contained in the casing so as to be rotatable, a magnetic tape wound around on the reel hubs, a support pin projecting from the casing, a pad provided near an area of rotation of the hub, the pad having an intermediate portion turnably supported by the support pin and an end portion for pushing the magnetic tape to guide rollers and/or guide poles provided at the area where the magnetic tape runs, and a rib projecting from the casing and having the free end which is in contact with the other end portion of the pad so that the one end portion of the pad is urged to a side wall of the casing.

3 Claims, 3 Drawing Sheets

MAGNETIC TAPE CASSETTE

BACKGROUND OF THE INVENTION

1. Field of the Invention

The present invention relates to a magnetic tape cassette used for an audio or a video tape recorder, which has a pad for pushing a magnetic tape against guide rollers or guide poles.

2. Discussion of Background

There has been known a magnetic tape cassette of a type that a magnetic tape is wound around reel hubs rotatably supported in the casing. When data recorded in the magnetic tape are to be reproduced, the magnetic tape rewound at a supplying side reel hub runs toward a winding side reel hub while it is guided by guide rollers and/or guide poles arranged in a running path of the magnetic tape. When the magnetic tape is rewound at a winding side reel hub, it is driven in the opposite direction. In this case, the guide poles simply determine the passage of the magnetic tape, and the guide rollers supported in a freely rotatable manner function not only to determine the running path but also to make the running of the magnetic tape smooth. A pad is provided in the casing to push the magnetic tape against the guide rollers and/or the guide poles to remove a loosing state in the magnetic tape when it is driven in the magnetic tape cassette.

The pad 12 is constituted by an elongated thin member disposed near an area of rotation of the winding side reel hub 10 as shown in FIG. 6. The pad 12 has a fitting part 18 with an aperture at an intermediate portion near its one end in which a supporting pin 16 projecting from a casing 14 is inserted. The pad 12 has a pressing part 20 at the other end and an elongated arm 22 at the intermediate portion near the pressing part 20. In FIG. 6, reference numerals 24 and 26 designate guide rollers having a small diameter, a numeral 28 designates a guide roller having a large diameter, a numeral 30 designates the above-mentioned magnetic tape and a numeral 32 designates a front face to close a front opening 34 in the casing 14.

However, in the conventional magnetic tape cassette, when the pad 12 is elastically deformed by a friction casued by the magnetic tape when the tape is driven, the arm 22 of the pad 12 may be bent, whereby it enters in the area of rotation of the reel hub 10. When an accident of the contact of the pad 12 to the reel hub 10 takes place, the rotation of the reel hub 10 is hindered resulting in a fault of running. Further, there arise problems such that the pad 12 is damaged reducing its pressing force and scraped powder is deposited on the magnetic tape 30 to cause a drop-out phenomenon.

The inventors of the present application have proposed in Japanese Utility Model Application No. 105720/1987 (filed on July 9, 1987) a magnetic tape cassette wherein a member for restricting the position of a pad, which is formed integrally with the casing, is disposed at the rear side of a side wall of the casing so as to be interposed between the pad and an area of rotation of a reel hub. However, it is not always possible to dispose the pad position restricting member at such position because a certain type of casing has no sufficient space to accommodate the pad position restricting member at the rear side of the side wall of the casing and between the pad and the area of rotation of the reel hub.

SUMMARY OF THE INVENTION

It is an object of the present invention to provide a magnetic tape cassette free from the contacting of a pad to a magnetic tape without any pad position restricting member.

The foregoing and other objects of the present invention have been attained by providing a magnetic tape cassette which comprises a casing consisting of upper and lower half casings, reel hubs contained in the casing so as to be rotatable, a magnetic tape wound around on the reel hubs, a support pin projecting from the casing, a pad provided near an area of rotation of the hub, the pad having an intermediate portion turnably supported by the support pin and an end portion for pushing the magnetic tape to guide rollers and/or guide poles provided at the area where the magnetic tape runs, and a rib projecting from the casing and having the free end which is in contact with the other end portion of the pad so that the one end portion of the pad is urged to a side wall of the casing.

BRIEF DESCRIPTION OF THE DRAWINGS

A more complete appreciation of the invention and many of the attendent advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
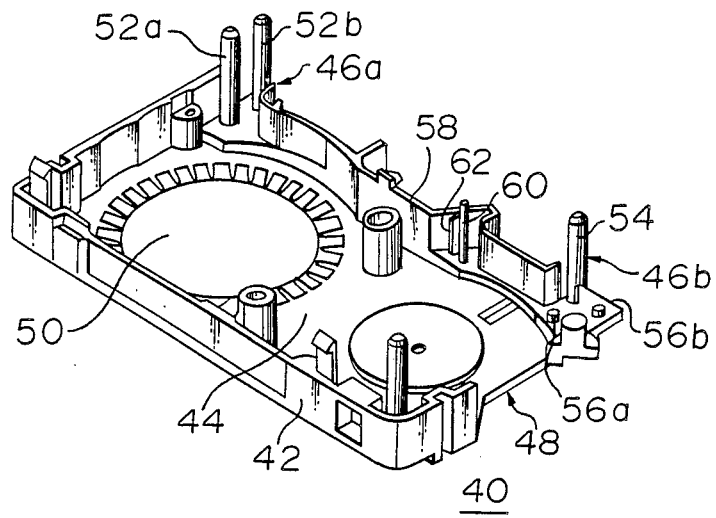
FIG. 1 is a perspective view of an embodiment of the lower half casing used for a VHS-C type magnetic tape cassette according to the present invention.
Figure 2:
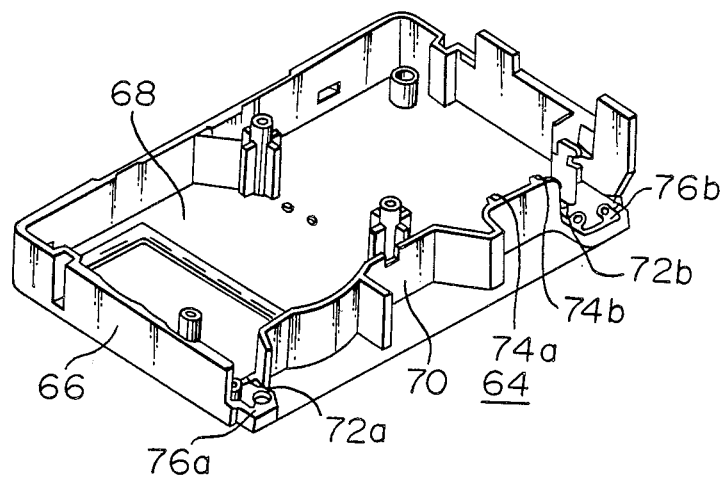
FIG. 2 is a perspective view of an embodiment of an upper half casing used for such magnetic tape cassette of the present invention.

An embodiment of the magnetic tape cassette according to the present invention will be described with reference to FIGS. 1 to 5, wherein FIG. 1 is a perspective view showing the inner structure of a lower half casing in a VHS-C type magnetic tape cassette and FIG. 2 is a perspective view showing the inner structure of an upper half casing for the magnetic tape cassette.

The lower half casing 40 is provided with a rectangular bottom face plate 44 and a circumferential wall 42 extending vertically from the circumference of the bottom face plate 44 at a substantially constant height. The circumferential wall 42 is not in a continuous form but is provided with openings 46a, 46b to lead in and out the magnetic tape and an opening 48 through which a part of the winding side reel hub projects. A hub driving shaft insertion opening 50 is formed in the bottom face plate 44. Two guide roller pins 52a, 52b having a large diameter are formed in a parallel relation near the opening 46a which is formed in the lower half casing 40 at the side of feeding the magnetic tape, whereby the magnetic tape is held between guide rollers mounted on the guide roller pins. On the other hand, a single guide roller pin 54 having a large diameter and two seat portions 56a, 56b at which guide roller pins having a small diameter are set up are formed near the opening 46b which is formed in the lower cassette casing at the side of winding the magnetic tape. The guide roller pin 54 and the two seat portions 56a, 56b are in such positional relation as to form an isosceles triangle, whereby guide rollers mounted on the guide roller pin 54 and guide roller pins set up at the seat portions 56a, 56b hold the magnetic tape which runs in and between the guide rollers.

This arrangement is adopted in view of the drawback of the conventional magnetic tape cassette due to inferior cylindricity of the guide rollers, which may deform the magnetic tape. Such problem resulted because metal pins having the same diameter are used as supporting pins for supporting guide rollers irrespective of the diameter of the guide rollers even when the diameter of the guide rollers is different from each other. This causes increase in the wall thickness of the guide roller when it has a large diameter, whereby a recess is formed in the outer circumferential surface of the guide roller due to shrinkage when the guide roller is molded.

In the present invention, the supporting pin for the guide roller having a large diameter is formed integrally with the lower half casing and the wall thickness of the guide roller to be mounted on the supporting pin is determined to have the optimum dimension, whereby the guide roller having good cylindricity is obtainable to thereby eliminate a drop-out or deformation of the magnetic tape, and to improve characteristics such as output level variation. Further, number of parts is reduced by forming the supporting pin integrally with the cassette casing to thereby improve the quality of the cassette casing and to reduce manufacturing cost. Guide poles may be used for the guide rollers having a small diameter.

First and second pads are respectively provided near the openings 46a, 46b and inside the side wall 58 to force the magnetic tape against the guide rollers by their pressing part. The first pad placed at the magnetic tape feeding opening has a smaller length and one end of the pad is attached to the rear side of the side wall 58 because a space for the first pad is limited in the casing. On the other hand, the second pad disposed at the magnetic tape winding side opening is in an elongated form to increase elasticity, and an intermediate portion near one end of the second pad is supported by a pad supporting pin 60 which vertically extends from the bottom face plate 44 at a position apart from the magnetic tape winding side opening 46b and the other end of the pad extends along the rear side of the side wall 58. The second pad is arranged near an area of rotation of the winding side reel hub. In the present invention, in order to prevent the pad at the tape winding side from coming into the area of rotation of the reel hub, a rib 62 is provided so as to extend from the rear side of the side wall 58 and the bottom face plate 44 so that the rib 62 is in contact with the one end (opposite the area of rotation) of the pad with respect to the intermediate portion near the one end of the pad, which is supported by the supporting pin 60 and the opposite portion extending to the area of rotation of the magnetic tape is urged to the rear side of the side wall 58. It is preferable that an edge or edges of the free end of the rib 62 are chamfered so as to facilitate assembling work for the pad 78. The rib 62 may be projected from at least one of the side wall and the bottom face plate of the lower half casing. The same rib as in the lower half casing may be provided in an upper half casing 64. Also, a pad supporting pin may be formed in the upper half casing.

The upper half casing 64 comprises a rectangular upper face plate 68 and a circumferential wall 66 extending from the outer circumference of the upper face plate 68 with a substantially constant height. The circumferential wall 66 is in a substantially continuous form except that there are two openings 72a, 72b at both sides of the side wall 70 to pass the magnetic tape therethrough. The openings 72a, 72b and the side wall 70 of the upper half casing 64 are respectively correspond in position to openings 46a, 46b and the side wall 58 of the lower half casing 40. Two small ribs 74a, 74b are projectingly formed as a pad position restricting member in the side wall 70 of the upper half casing 64 at a position substantially corresponding to the other end portion of the pad in the lower half casing 40. Seat portions 76a, 76b are formed in the upper face plate 68 in the area of the both openings 72a, 72b to accept the other end of the guide roller pins 52a, 52b, 54 which project from the bottom face plate 44 of the lower half casing 40.

Figure 3:
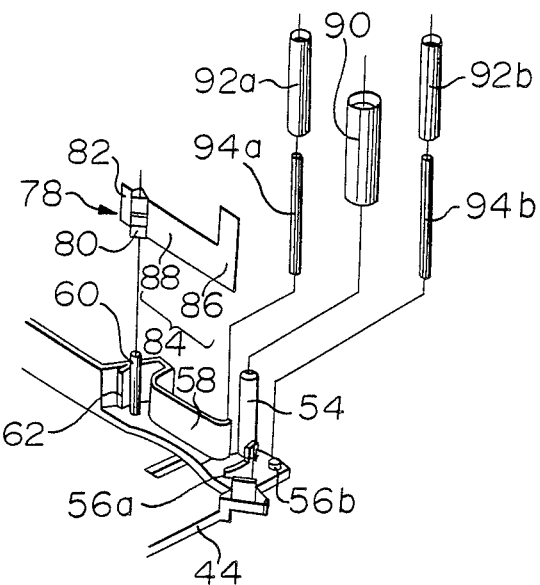
FIG. 3 is a perspective view in a disassembled state of a portion of or near an opening at a magnetic tape winding side of the magnetic tape cassette shown in FIG. 1.
Figure 4:
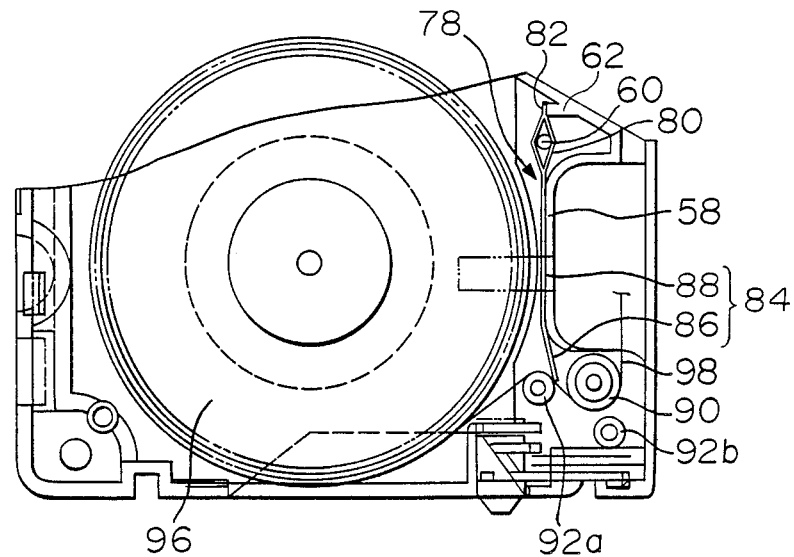
FIG. 4 is a front view showing a magnetic tape cassette in an assembled state but removing an upper face plate of the magnetic type cassette of the present invention.
Figure 6:
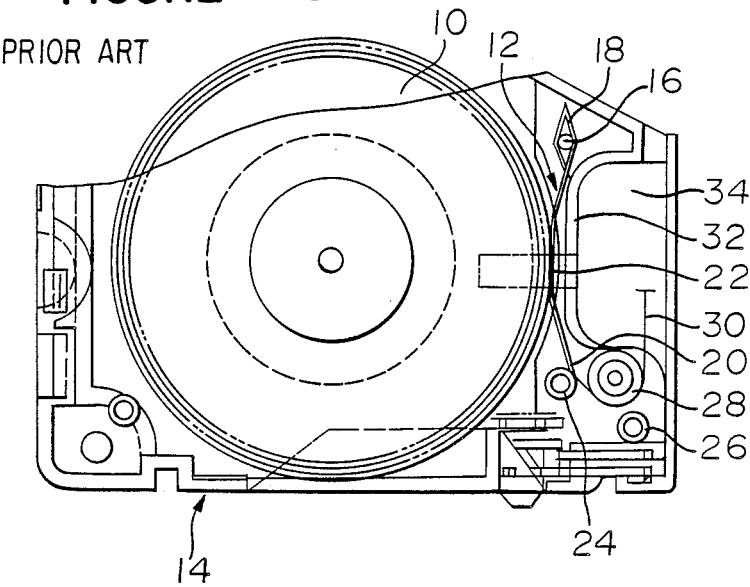
FIG. 6 is a front view of a part corresponding to FIG. 4 in a conventional VHS-C type magnetic tape cassette.

FIG. 3 is a perspective view showing the magnetic tape winding side opening in a disassembled state and FIG. 4 is a front view of the magnetic tape cassette in an assembled state but removing the upper face plate. In FIGS. 3 and 4, reference numeral 78 designates an elongated sheet-like pad made of a plastic material which comprises a fitting part 80 with an aperture in which the pad supporting pin 60 is inserted.

The position of the fitting part 80 is determined to be in the intermediate portion near the one end with which the rib 62 is in contact. Thus, the pad 78 is divided into two portions with respect to the pad supporting pin 60: one side 82 of the pad (opposite the area of rotation of the magnetic tape) is shorter and the other side 84 (the magnetic tape side) is longer. The free end portion of the other side 84 constitutes a pressing part 86 and the rest portion of the other side 84 constitutes an intermediate arm portion 88. The pad 78 is fitted to the pad supporting pin 60 in which the one side 82 is in contact with the rib 62 projecting from the rear side of the side wall 58 and the bottom face plate 44 of the lower half casing 40, and the other side 84 is urged against the rear side of the side wall 58 of the lower half casing 40. A guide roller 90 is fitted around the guide roller pin 54 having a large diameter, and guide rollers 92a, 92b are respectively fitted around guide roller pins 94a, 94b having a small diameter which are set up pad seat portions 56a, 56b.

When the above-mentioned elements are assembled together, the one side portion 82 of the pad 78 is in contact with the rib 62 projecting from the side wall 58 and the bottom face plate 44 of the lower half casing 40. Accordingly, if the contacting surface of the rib 62 is positioned away from the rear side of the side wall 58 so that it is moved toward an area of rotation of the winding side reel hub 96, the other side portion 84 of the pad 78 is also moved. Since the pad 78 is turnably supported around the point of support by the pad supporting pin 60, the other side portion 84 of the pad is moved away from the area of rotation of the magnetic tape wound around the winding side reel hub 96, and approaches the rear side of the side wall 58. By suitably selecting the position of the contacting surface of the supporting pin 60, the other side portion 84 is positioned at the side wall 58 of the lower half casing 40 with a desired pressing force. Accordingly, even though a force of deformation is applied to the pad 78 during the running of the magnetic tape 98, there is no risk of the pad 78 entering into the area of rotation of the magnetic tape. The movement of the magnetic tape in the vertical direction can be restricted by the ribs 74 projecting from the side wall 70 of the upper half casing 64. As a result, interference between the pad 78 and the reel hub 96 can be eliminated, whereby the pad 78 is seldom damaged and a smooth rotation of the reel hub 96 can be obtained.

Figure 5:
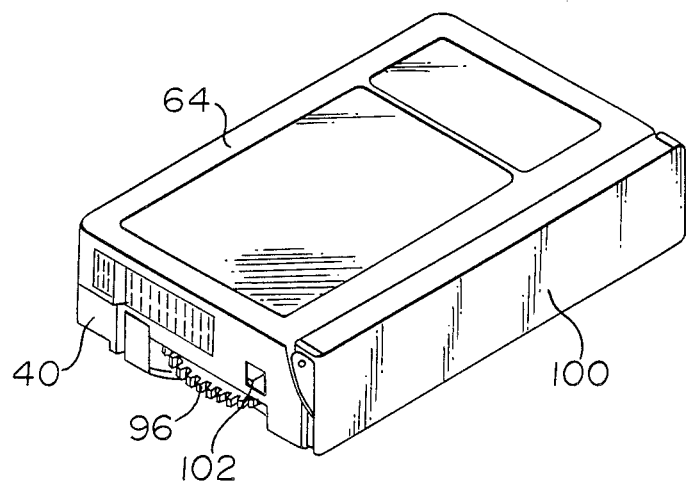
FIG. 5 is a perspective view of a VHS-C type magnetic tape cassette in which the present invention is applied.

FIG. 5 is a perspective view of a magnetic tape cassette of the present invention. In FIG. 5, a numeral 100 designates a front cover capable of opening and closing the front opening of the assembled upper and lower half casings 40, 64 in which the magnetic tape wound around the reel hubs 96 is received. The front cover 100 closes the front face of the tape cassette in a locking condition when the magnetic tape cassette is not used. When the magnetic tape cassette is mounted on a deck to use it, an operating lever 102 is pushed so that the front cover 100 is opened. Then, the magnetic tape is exposed at the front opening of the cassette to allow a loading operation.

Thus, the magnetic tape cassette of the present invention eliminates the interference between the pad and the reel hub, and minimizes a fault in running operations to thereby avoid a trouble such as a drop-out.

Obviously, numerous modifications and variations of the present invention are possible in light of the above teachings. It is therefore to be understood that within the scope of the appended claims, the invention may be practiced otherwise than as specifically described herein.

We claim:
1. A magnetic tape cassette which comprises:
   a casing consisting of upper and lower half casings and having guide rollers and/or poles,
   reel hubs contained in said casing so as to be rotatable,
   a magnetic tape wound around on said reel hubs,
   a support pin projecting from said casing,
   a pad provided near an area of rotation of said hub, said pad being supported by said support pin at an intermediate portion of said pad, said pad having one end portion at one side of said intermediate portion, and another end portion at another side of said intermediate portion and opposite said one end portion for pushing said magnetic tape to said guide rollers and/or poles which are provided at the area where said magnetic tape runs, and
   a rib projecting from said casing and having a free end which is in contact with said one end portion of said pad and which is positioned so that said another end portion of the pad is urged against a side wall of said casing by said rib when said another end portion pushes said magnetic tape to said guide rollers and/or poles.
2. The magnetic tape cassette according to claim 1, wherein said support pin is extended from the bottom surface of said lower half casing in a direction substantially parallel to the rotational axes of said reel hubs.
3. The magnetic tape cassette according to claim 1, wherein said rib is formed near said support pin and extended inwardly from a side wall of said lower half casing.

* * * * *